US009618248B2

(12) United States Patent
Iyengar

(10) Patent No.: US 9,618,248 B2
(45) Date of Patent: Apr. 11, 2017

(54) REFRIGERANT RECOVERY AND RECHARGE DEVICE

(75) Inventor: Venkatesh Gorur Krishna Iyengar, Banagalore (IN)

(73) Assignee: Mahle International GmbH (DE)

( * ) Notice: Subject to any disclaimer, the term of this patent is extended or adjusted under 35 U.S.C. 154(b) by 17 days.

(21) Appl. No.: 14/131,322

(22) PCT Filed: May 9, 2012

(86) PCT No.: PCT/EP2012/058504
§ 371 (c)(1),
(2), (4) Date: Jan. 7, 2014

(87) PCT Pub. No.: WO2013/007412
PCT Pub. Date: Jan. 17, 2013

(65) Prior Publication Data
US 2014/0137579 A1 May 22, 2014

(30) Foreign Application Priority Data
Jul. 8, 2011 (IN) .......................... 2335/CHE/2011

(51) Int. Cl.
*F25B 45/00* (2006.01)
*B60H 1/00* (2006.01)
*F25B 43/02* (2006.01)

(52) U.S. Cl.
CPC .......... *F25B 45/00* (2013.01); *B60H 1/00585* (2013.01); *F25B 43/02* (2013.01); *F25B 2345/004* (2013.01)

(58) Field of Classification Search
CPC ................. F25B 45/00; F25B 2345/002; F25B 2345/001
(Continued)

(56) References Cited

U.S. PATENT DOCUMENTS 4,912,937 A * 4/1990 Nakamura ............... F24F 1/022
62/160
6,202,433 B1 * 3/2001 Murray ............... B60H 1/00585
62/149
(Continued)

FOREIGN PATENT DOCUMENTS

CN 1165279 A 11/1997
CN 1346957 A 5/2002
(Continued)

OTHER PUBLICATIONS

International Search Report corresponding to PCT Application No. PCT/EP2012/058504, mailed Sep. 19, 2012 (4 pages).
(Continued)

Primary Examiner — Melvin Jones
(74) Attorney, Agent, or Firm — Fishman Stewart PLLC

(57) ABSTRACT

A refrigerant recovery and recharge device and a method to recharge oil to refrigeration equipment is disclosed. The refrigerant recovery and recharge device comprises a valve block which is adapted to establish fluid communication between the device and refrigeration equipment and a recharge path adapted to recharge oil to the refrigeration equipment through an outlet in the valve block. The device further comprises at least a first oil container and a second oil container and the valve block comprises a valve with a first inlet and a second inlet. The first oil container is in fluid communication with the first inlet and the second oil container is in fluid communication with the second inlet to recharge oil to the refrigeration equipment. The method for recharging oil recharges oil either from the first oil container or the second oil container in dependence of the type of fuel used in the vehicle.

16 Claims, 1 Drawing Sheet

(58) Field of Classification Search
USPC .................................. 62/77, 149, 292, 298
See application file for complete search history.

(56) References Cited

U.S. PATENT DOCUMENTS

| | | | |
|---|---|---|---|
| 6,510,698 B2 * | 1/2003 | Kasai | ...................... F25B 13/00 62/292 |
| 2006/0130511 A1 | 6/2006 | Brown et al. | |
| 2009/0188263 A1 | 7/2009 | Murray et al. | |
| 2009/0272131 A1 * | 11/2009 | McMasters | ........ B60H 1/00585 62/77 |

FOREIGN PATENT DOCUMENTS

| | | |
|---|---|---|
| CN | 2742351 Y | 11/2005 |
| DE | 20 2006 001 374 U1 | 7/2007 |
| DE | 20 2010 013 793 U1 | 4/2011 |
| WO | 2011/041874 A1 | 4/2011 |

OTHER PUBLICATIONS

English Abstract for CN 1165279A.
English Abstract for CN 1346957A.
English Abstract for CN 2742351Y.

\* cited by examiner

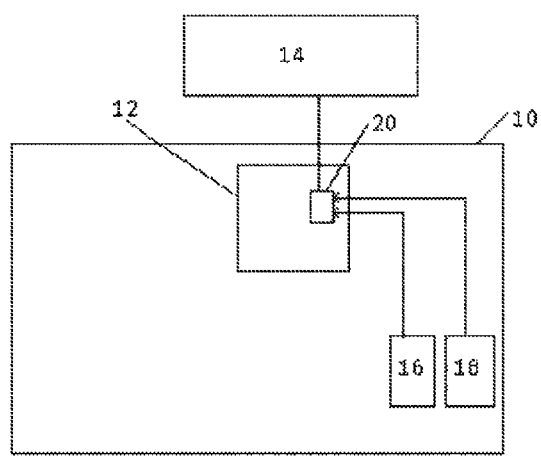

REFRIGERANT RECOVERY AND RECHARGE DEVICE

CROSS-REFERENCE TO RELATED APPLICATIONS

This application is a 35 U.S.C. §371 National Stage Application of PCT/EP2012/058504, filed on May 9, 2012, which claims the benefit of priority to Serial No. IN 2335/CHE/2011, filed on Jul. 8, 2011 in India, the disclosures of which are incorporated herein by reference in their entirety.

TECHNICAL FIELD

This disclosure relates to a refrigerant recovery and recharge device.

In particular, this disclosure relates to a refrigerant recovery and recharge device for refrigeration equipment in a vehicle.

BACKGROUND

A wide range of refrigerant recovery and recharge devices are already known. The refrigerant recovery and recharge device comprises an oil container which is used to recharge oil from the device to refrigeration equipment through the recharge path. The devices known in the prior art use oil recharge methods that have two separate recharge paths or a specialized/specified method to recharge two different types of oils without contamination. Generally conventional automobiles have compressors which are lubricated with mineral oil, generally called as PAG oils. Modern automobiles with hybrid concept may utilize electrically driven compressors. The mineral oil used in normal compressors could damage the electrical compressors due to high conductivity and hence non-conductive oil generally called as POE oils are used in hybrid automobiles. The challenge with this situation to the workshops servicing refrigeration equipment of automobiles using conventional refrigerant recovery and recharge devices is to avoid contamination of the two oils mentioned above. To overcome such challenges non-conventional complicated methods are required to recharge the correct oil in the refrigeration equipment. Non-conventional methods could include dedicated machines for servicing hybrid and conventional automobiles or avoiding oil recharge in automatic mode but with a special fitment onto the refrigerant recovery and recharge device.

SUMMARY

The device and method described herein have the following advantages. The device comprises a valve block comprising a valve having two inlets. A first oil container is in fluid communication with a first inlet and a second oil container is in fluid communication with a second inlet. The first oil container and the second oil container contain two different types of oil. Thus, the recharge path for each oil is separate. This ensures that there is no contamination of the oil from the two oil containers, but still has the advantage of using the same refrigerant recharge and recovery device for vehicles using different types of fuel. Prevention of contamination of the oil from the two containers ensures safer operation of the compressor in the refrigeration equipment in vehicles. The method used for recharging oil to the refrigeration equipment reduces the liability of the operator servicing refrigeration equipment from damaging a vehicle compressor due to contamination caused from mixing of the two oils.

BRIEF DESCRIPTION OF THE DRAWINGS

Different modes of the disclosure are disclosed in detail in the description and illustrated in the accompanying drawing:

The FIGURE illustrates various components of the refrigerant recovery and recharge device in accordance with this disclosure.

DETAILED DESCRIPTION

The FIGURE illustrates various components of the refrigerant recovery and recharge device in accordance with the disclosure. The device 10 comprises a valve block 12. The valve block 12 comprises a plurality of valves, which are switched from an off position to an on position and vice versa. When the valves are switched to an on position a fluid communication is established between refrigeration equipment 14 and the device 10 through the valves in the valve block 12. The device 10 comprises a recharge path which is used to recharge refrigerant and oil from the device 10 to the refrigeration equipment 14. A first oil container 16 and a second oil container 18 are provided in the device 10. The valve block 12 further comprises a valve 20. The valve 20 has two inlets, a first inlet and a second inlet. The first oil container 16 is in fluid communication with the first inlet and the second oil container 18 is in fluid communication with the second inlet in the valve 20 of the valve block 12.

Refrigeration equipment 14 is widely used in many applications including air conditioning systems, refrigerators, vehicle air conditioners and the like. Refrigerant equipment 14 makes use of a refrigerant for the purposes of cooling, and other liquids such as oil and UV dyes are used for other applications in the refrigeration equipment 14. Due to prolonged usage of the refrigeration equipment 14, the ability of the refrigerant to cool reduces, and properties of the oil and UV dyes are reduced over a period of time. It then becomes necessary to replace the refrigerant, oil, and other liquids with fresh refrigerant and oil.

For the purposes of recovering the refrigerant and the oil and for recharging new refrigerant and oil to the refrigeration equipment 14 a refrigerant recovery and recharge device 10 is used. While servicing the refrigeration equipment 14 the refrigerant recovery and recharge device 10 is connected with the refrigeration equipment 14. When the refrigerant recovery and recharge device 10 is switched on, depending on the recovery and recharge algorithm, which is based on the pressure difference between the refrigeration equipment 14 and the refrigerant recovery and recharge device 10, the refrigerant and oil is recovered and later recharged into the refrigeration equipment 14.

A conventional refrigerant recovery and recharge device 10 comprises a valve block 12, which is used to establish a fluid communication between the refrigeration equipment 14 and the refrigerant recovery and recharge device 10. There exists a recovery path along which the aged refrigerant and oil flow from the refrigeration equipment 14 to the refrigerant recovery and recharge device 10. There also exists a recharge path along which the fresh refrigerant and oil flow from the refrigerant recovery and recharge device 10 to the refrigeration equipment 14. The refrigerant to be recharged is stored in a tank, while the oil to be recharged is stored in a container. The oil container containing fresh oil is connected in the recharge path. For better understanding of the disclosure, the refrigeration equipment 14 is air conditioning equipment in a vehicle.

Vehicles using different types of fuel have different requirements and specifications with respect to the type of refrigerant, oil and the like used in the air conditioning equipment. Refrigeration equipment 14 in a fossil fuel vehicle has a compressor which makes use of mineral oils which are conductive oils such as Polyalkylene Glycol Oils popularly known as PAG oils. Refrigeration equipment 14 in a hybrid fuel vehicle has an electric compressor which makes use of non-conductive oils such as Polyester Oils popularly known as POE oils. Thus, depending on the type of fuel used in the vehicle, the oil to be recharged to the refrigeration equipment 14 varies.

While recharging oil from the refrigerant recovery and recharge device 10 to the refrigeration equipment 14, care has to be taken that for a fossil fuel car POE oil is not recharged, and similarly for a hybrid fuel car PAG oil is not recharged. It is also necessary to take care that the recharge path for the PAG oil and POE oil is not the same. If the recharge path is the same this leads to contaminations, which reduce the efficiency and life of the compressor in the refrigeration recovery and recharge device 10. Due to the harm caused by the contamination of the PAG oil and POE oil, it is not possible to merely replace the oil container in the refrigerant recovery and recharge device 10.

A conventional refrigerant recovery and recharge device 10 does not have the capability to accommodate a separate recharge path for two separate oil containers having two different oils. Using a conventional refrigerant recovery and recharge device 10 the only possibility of recharging different oil was by connecting it externally. However, this has the disadvantage that the amount of oil to be recharged cannot be controlled. Another disadvantage is that it is not possible to guarantee that there will be no contamination. Another disadvantage is that there was no possibility of preventing the POE oil bottle being connected in place of the PAG oil bottle and vice versa.

The object of this disclosure is to be able to recharge oil using the refrigerant recovery and recharge device 10 depending on the type of fuel used in the vehicle. In accordance with the disclosure, the device 10 comprises a valve block 12 comprising a plurality of valves which are adapted to be switched from an off position to an on position and vice versa. When the valves are switched to an on position, a fluid communication is established between the refrigeration equipment 14 and the device 10 through the valves in the valve block 12. When the connection is established, depending on the type of fuel used in the vehicle, the oil is recharged to the refrigeration equipment 14. Thus if the vehicle uses fossil fuel, then the first oil container 16 containing a PAG oil is connected in the recharge path. If the vehicle uses hybrid fuel, then the second container 18 containing POE oil is connected in the recharge path.

The connection between the first oil container 16, the second oil container 18 and the valve 20 is established using a component known as a quick coupler. The first oil container 16 and the second oil container 18 have male and female connectors. The connection between the first oil container 16, the second oil container 18 and the valve 20 in the valve block 12 through the male and female connectors is such that the first oil container 16 cannot be fitted in place of the second oil container 18 and vice versa. If by mistake the operator connects the first oil container 16 in place of the second oil container 18 and the oil recharge is started, the refrigerant recovery and recharge device 10 will not recharge any oil to the refrigeration equipment 14 in the vehicle. Thus the device 10 has the advantage that it provides a full-proof possibility of recharging oil into the refrigeration equipment of vehicles which use different fuels. Further separate hoses are used to carry the oil from the first oil container 16 and the second oil container 18 to the valve 20. This further ensures that there is no possibility of contamination of the different oils.

The method of recharging oil from the first oil container 16 or the second oil container 18 to the refrigeration equipment 14 can be explained as follows. At one time oil from only one of the oil containers 16 or 18 is recharged to the refrigeration equipment 14. While recharging refrigerant and oil from the refrigerant recovery and recharge device 10 to the refrigeration equipment 14 in the vehicle, the operator of the refrigerant recovery and recharge device 10 presses a button on a front console of the device 10 to select that the vehicle uses fossil fuel or hybrid fuel. When the operator selects that the refrigeration equipment 14 is one which is used in a fossil fuel vehicle, the valve 20 is switched such that only the first oil container 16 containing PAG oil is connected to the recharge path and the oil from the first oil container 16 is recharged to the refrigeration equipment 14. Similarly, when the operator selects that the refrigeration equipment 14 is one which is used in a hybrid fuel vehicle, the valve 20 is switched such that only the second oil container 18 containing POE oil is connected to the recharge path and the oil from the second oil container 18 is recharged to the refrigeration equipment 14. Thus, the advantage of the device 10 in accordance with this disclosure is that one device 10 can be used to recharge oil and refrigerant to refrigeration equipment 14 in vehicles which use different types of fuel.

If at one instant in time the oil is being recharged to a refrigeration equipment 14 of a vehicle using fossil fuel and at a later instant if the operator selects that the oil has now to be recharged to a refrigeration equipment 14 of a vehicle using hybrid fuel, the device 10 does not immediately switch to the other oil container. As some residual oil from the previous recharge will be stuck in the hose which connects the device 10 and the refrigeration equipment 14, it is necessary that the residual oil be removed from the recharge path otherwise this may lead to contamination. Thus, before switching to the other oil container, a small quantity of refrigerant which is stored in the device 10 is circulated along the recharge path such that any residual oil which may be present in the recharge is washed away. Once the residual oil is washed away, the other oil container is connected in the recharge path and recharge can be started. Thus, the device 10 ensures that any possibility of contamination of the oil is completely prevented.

The invention claimed is:
1. A refrigerant recovery and recharge device comprising:
 a valve block configured to establish fluid communication between said refrigerant and recovery device and refrigeration equipment;
 a recharge path configured to recharge oil to said refrigeration equipment through an outlet in said valve block;
 a first oil container configured to recharge oil to said refrigeration equipment through said recharge path; and
 a second oil container configured to recharge oil to said refrigeration equipment through said recharge path;
 wherein the valve block includes a valve with a first inlet and a second inlet, said first oil container being in fluid communication with said first inlet and said second oil container being in fluid communication with said second inlet to recharge oil to said refrigeration equipment; and wherein said first oil container and said second oil container contain different oils.

2. The device as claimed in claim 1, wherein said refrigeration equipment is vehicle refrigeration equipment.

3. The device as claimed in claim 1, wherein said first oil container contains oil used in the refrigeration equipment of a fossil fuel vehicle.

4. The device as claimed in claim 1, wherein said second oil container contains oil used in the refrigeration equipment of a hybrid vehicle.

5. The device as claimed in claim 1, wherein said valve in said valve block is used to selectively recharge oil from one of said first oil container and said second oil container to said refrigeration equipment.

6. The device as claimed in claim 1, wherein one of said first oil container and said second oil container has a male connector and the other has a female connector to connect said first oil container and said second oil container to said valve.

7. A method to recharge oil in vehicle refrigeration equipment using a refrigerant recovery and recharge device, said method comprising:

establishing a fluid communication between the vehicle refrigeration equipment and a refrigerant recovery and recharge device through a valve in a valve block; and recharging oil to said refrigeration equipment from one of a first oil container, which contains a first oil, and a second oil container, which contains a second oil that is different from the first oil, depending on a type of oil used by said vehicle refrigeration equipment.

8. The method as claimed in claim 7, wherein the recharging of the oil to said refrigeration equipment includes charging said first oil to the refrigeration equipment of a fossil fuel vehicle.

9. The method as claimed in claim 7, wherein the recharging of the oil to said refrigeration equipment includes charging said second oil to the refrigeration equipment of a hybrid vehicle.

10. The method as claimed in claim 7, wherein the recharging of the oil to said refrigeration equipment includes operating said valve in said valve block to selectively recharge oil from one of said first oil container and said second oil container to said refrigeration equipment.

11. The method as claimed in claim 7, wherein one of said first oil container and said second oil container has a male connector and the other has a female connector to connect said first oil container and said second oil container to said valve.

12. A refrigerant recovery and recharge device comprising:

a valve block configured to establish fluid communication between said refrigerant and recovery device and refrigeration equipment;

a recharge path configured to recharge oil to said refrigeration equipment through an outlet in said valve block;

a first oil container configured to recharge oil to said refrigeration equipment through said recharge path; and a second oil container configured to recharge oil to said refrigeration equipment through said recharge path;

wherein the valve block includes a valve with a first inlet and a second inlet, said first oil container being in fluid communication with said first inlet and said second oil container being in fluid communication with said second inlet, to selectively recharge oil from one of said first oil container and said second oil container to said refrigeration equipment.

13. The device as claimed in claim 12, wherein said refrigeration equipment is vehicle refrigeration equipment.

14. The device as claimed in claim 12, wherein said first oil container contains oil used in the refrigeration equipment of a fossil fuel vehicle.

15. The device as claimed in claim 12, wherein said second oil container contains oil used in the refrigeration equipment of a hybrid vehicle.

16. The device as claimed in claim 12, wherein one of said first oil container and said second oil container has a male connector and the other has a female connector to connect said first oil container and said second oil container to said valve.

* * * * *